United States Patent [19]

Takahashi et al.

[11] Patent Number: 5,241,852
[45] Date of Patent: Sep. 7, 1993

[54] APPARATUS AND METHOD FOR TESTING THE WATERPROOFNESS OF A CAMERA CASING

[75] Inventors: Yasuyuki Takahashi; Akihiro Arai, both of Tokyo, Japan

[73] Assignee: Asahi Kogaku Kogyo Kabushiki Kaisha, Tokyo, Japan

[21] Appl. No.: 944,843

[22] Filed: Sep. 14, 1992

[30] Foreign Application Priority Data

Sep. 13, 1991 [JP] Japan ............................. 3081894[U]

[51] Int. Cl.5 ............................................. G01M 3/32
[52] U.S. Cl. ...................................... 73/49.3; 73/45.5
[58] Field of Search ............... 73/40, 49.2 R, 37, 45.5, 73/41.2, 49.3, 52

[56] References Cited

U.S. PATENT DOCUMENTS

| | | | |
|---|---|---|---|
| 3,793,876 | 2/1974 | Oswald | 73/49.2 |
| 3,807,219 | 4/1974 | Wallskog | 73/40 |
| 4,048,845 | 9/1977 | Gilbert | 73/45.5 |
| 4,878,376 | 11/1989 | Leonov et al. | 73/40 |

FOREIGN PATENT DOCUMENTS 204127  8/1988  Japan ........................................ 73/40

*Primary Examiner*—Hezron E. Williams
*Assistant Examiner*—Nashmiya Ashraf
*Attorney, Agent, or Firm*—Kane, Dalsimer, Sullivan, Kurucz, Levy, Eisele and Richard

[57] ABSTRACT

An apparatus for testing the waterproofness of a casing having divided casing elements which are connected to each other at opposite end surfaces thereof, includes a dummy casing made from liquid rubber material which has been cured, after a connecting end surface of one of the divided casing elements has been inserted therein, to form a recessed groove corresponding to the connecting end surface. A connecting end surface of one of the divided casing elements is then depressed against the recessed groove of the dummy casing to form a sealed assembly. The waterproofness of the casing can then be determined by determining the waterproofness of the assembly.

19 Claims, 2 Drawing Sheets

APPARATUS AND METHOD FOR TESTING THE WATERPROOFNESS OF A CAMERA CASING

BACKGROUND OF THE INVENTION

Field of the Invention

The present invention relates to an apparatus and method for testing the waterproofness of a casing. More precisely, it relates to an apparatus and method for testing the waterproofness of a casing, wherein the waterproofness can be examined before the casing has been completely assembled.

Description of Related Art

A waterproof casing of a camera, for example, is usually comprised of a plurality of constituent elements which are connected to each other by an adhesive or through a seal member to ensure a water tightness. To determine the water tightness of the camera, the waterproof casing, after being completely assembled, is subject to some form of water pressure to determine if a defect exists. This testing method is, however, not efficient. Generally speaking, the water tightness of the separate casing elements cannot be independently tested. Only after the elements are assembled into a waterproof casing can it be detected that a particular element is defective. If one of the casing elements is found to be defective, the casing must be disassembled, the defective casing element exchanged for a new element, and then the casing elements must be assembled and tested again.

SUMMARY OF THE INVENTION

The primary object of the present invention is to provide an apparatus and method for testing a waterproof casing, wherein the waterproofness of the casing can be detected before the casing has been completely assembled.

To achieve the object mentioned above, according to the present invention, there is provided a method for testing a waterproof casing having divided casing elements which are connected to each other at opposite end surfaces thereof, comprising the preparation of a dummy casing made of liquid rubber material in which a connecting end surface of one of the divided casing elements, to which the dummy casing is to be connected, is inserted. The liquid rubber material is then cured (set) to form a recessed groove corresponding to the connecting end surface. After the liquid rubber material has been cured, the connecting end surface is removed. The connecting end surface and other similar connecting end surfaces can then be inserted into the recessed groove of the dummy casing to form a sealed assembly. A testing waterproofness is then made to the sealed assembly. Specifically, for example, a pressure difference is then established between an internal space of the sealed assembly and the outside thereof. Finally, a change in pressure per unit time is observed to detect the waterproof capacity of the assembly.

According to another aspect of the present invention, there is provided an apparatus for testing a waterproof casing having divided casing elements which are connected to each other at opposite connecting end surfaces thereof, comprising a dummy casing made of liquid rubber material which has been cured, after a connecting end surface of one of the divided casing elements has been inserted therein, to form a recessed groove corresponding to the connecting end surface. The connecting end surface of the divided casing element is then depressed against the recessed groove to form a sealed assembly. The waterproofness of the casing can then be detected by detecting the waterproofness of the assembly.

The present disclosure relates to subject matter contained in Japanese utility model application No. 3-81894 (filed on Sep. 13, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 2:
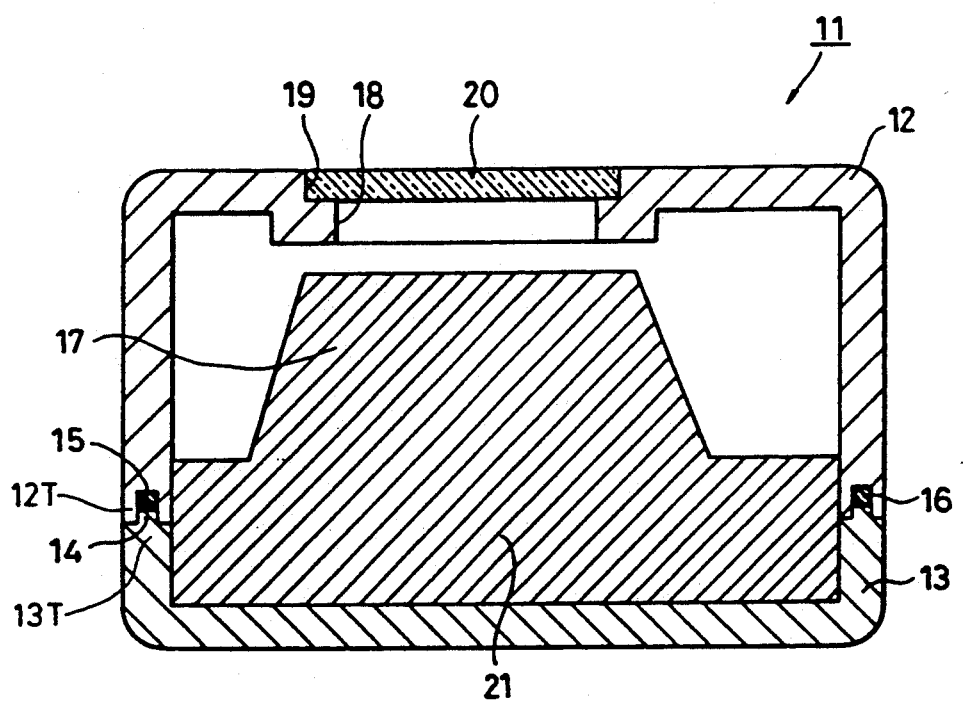

FIG. 2 shows a waterproof casing of a camera to which the present invention is applied. The waterproof casing 11 has a front cover (casing member) 12 and a rear cover (casing member) 13. The front and rear covers 12 and 13 are provided, on connecting surfaces 12T and 13T thereof, with an engaging recess (female connector) 15 and a projection (male connector) 14, respectively. The projection 14 can be fitted into the corresponding recess 15 when the front and rear covers 12 and 13 are connected to each other. A seal member 16 is provided between the engaging recess 15 and the projection 14 to establish a water tight connection therebetween.

The front cover 12 has a picture taking opening 18 opposed to a front surface of a lens 17 of a camera body 21, which is accommodated in the waterproof casing 11. The taking opening 18 is provided with a stepped portion 19 to which a transparent window 20 is fitted and adhered with an adhesive. The connection between the transparent window member 20 and the taking opening 18 must also be made in a water tight fashion.

According to the present invention, the water tightness of the assembled casing 11 can be determined by independently testing the front cover 12 or the rear cover 13.

Figure 1:
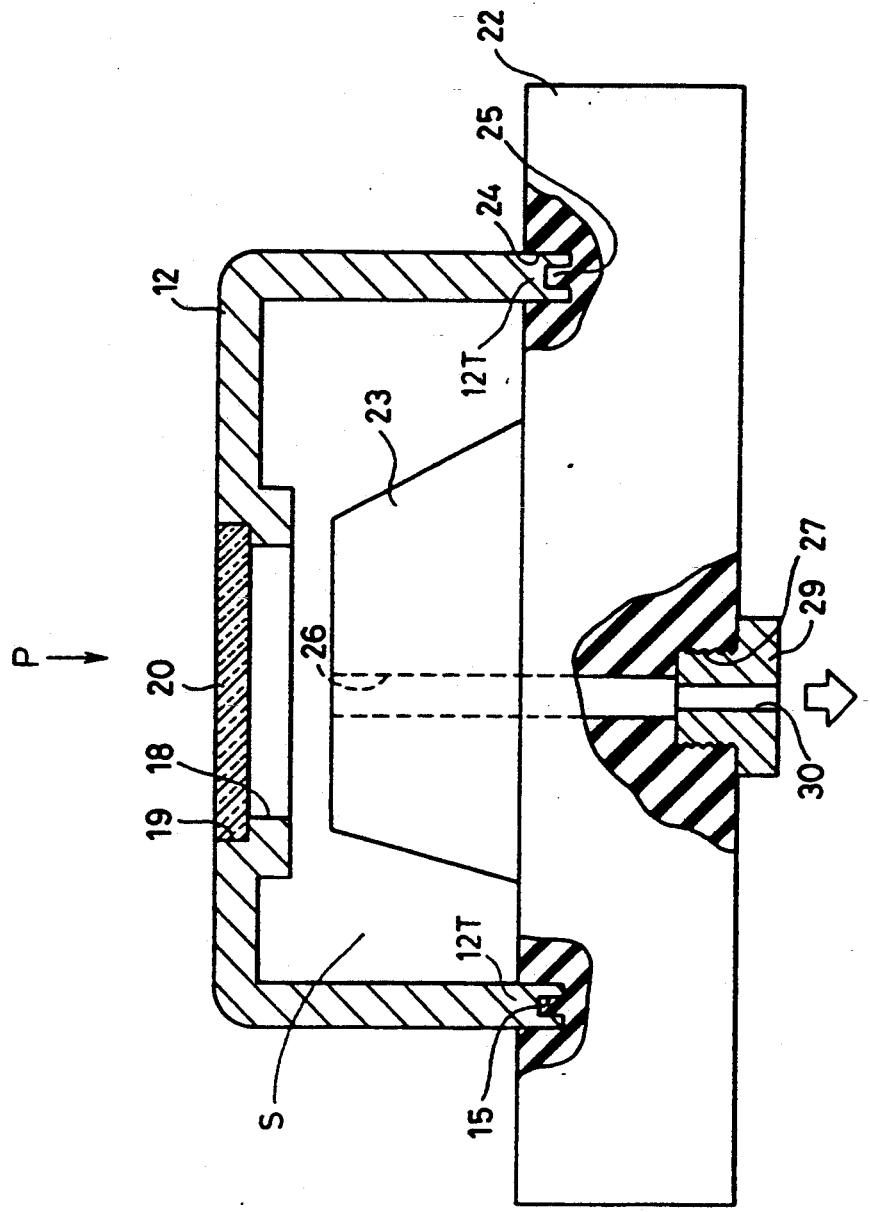
FIG. 1 is a longitudinal sectional view of a testing apparatus of a waterproof casing according to the present invention; and, FIG. 2 is a longitudinal sectional view of an assembled waterproof casing.

FIG. 1 shows a testing apparatus according to the present invention in which the water tightness of the front cover 12 of the waterproof casing 11, shown in FIG. 1, is independently tested. One of the most significant features of the present invention resides in a dummy casing 22 which is used in place of the rear cover 13 to assemble the water proof casing 11 for testing purposes.

Dummy casing 22 is made of a hollow housing which is filled with, for example, liquid silicone rubber (liquid rubber material) in which the connecting end surface 12T of the front cover 12 is inserted. The liquid silicone rubber is cured by a curing agent mixed therein after the end surface 12T of the front cover 12 is inserted therein. The front cover 12, which is used to prepare the dummy casing 22, is selected from those which have been mass-produced.

Dummy casing 22 is provided, on the upper center portion thereof, with a dummy lens portion (projection) 23 which is a replica of the lens portion 17 of the camera body 21 (FIG. 2). The dummy lens portion 23 is made of the same material (silicone rubber) as that of the testing dummy casing 22. Alternatively, it is possible to make the dummy lens portion 23 of a material different from the dummy casing 22, so that the dummy lens portion 23 is later secured to the dummy casing 22.

Dummy casing 22 is provided, on the portion thereof corresponding to the connecting end face 12T of the front cover 12, with an engaging groove 24, and on the portion thereof corresponding to the engaging recess 15 of the front cover 12, with an engaging projection 25 which serves as the engaging projection 14 of the rear cover 13.

A connecting air passage 26, which extends through the dummy casing 22 and the dummy lens portion 23, is provided in the dummy casing 22 to connect the upper surface of the dummy lens portion 23 and the lower surface of the dummy casing 22.

Dummy casing 22 is further provided, on the lower surface thereof, with a threaded hole 27 in which a male screw formed on the outer peripheral surface of an air passage connecting member 29 is screwed. The air passage connecting member 29 has a hole 30 which is connected at one end thereof to the air passage 26 and at the other end to a air compression or decompression device (not shown).

In the testing apparatus as constructed above, the front cover 12 is connected to the dummy casing 22 in a water tight fashion, so that the connecting end face 12T of the front cover 12, having the transparent window member 20 secured to the stepped portion 19, is fitted in the engaging groove 24 of the dummy casing 22, and the engaging projection 25 is fitted in the engaging recess 15. To establish a water tight connection between the front cover 12 and the dummy casing 22, an external pressure P can be applied to the front cover 12 to thereby force the latter against the dummy casing 22. The air passage connecting member 29, which is screwed into the threaded hole 27 of the dummy casing 22, is connected to the air compression or decompression device (not shown) in advance. In this state, the air compression or decompression device is operated to withdraw air from the internal space S within the front cover 12, which has been sealed by the dummy casing 22, through the air passage 26. The reduced pressure state is maintained for a predetermined test time, in which the change in pressure is detected, for example, by a pressure meter, to examine the water tightness.

Namely, if a water tight connection between the stepped portion 19 and the transparent window member 20 is established (i.e., the connection is not defective), there should be no pressure change. Consequently, the front cover 12 is determined to be a satisfactory element for maintaining a water tight connection between the stepped portion 19 and the transparent window member 20.

Conversely, if the water tight connection between the stepped portion 19 and the transparent window member 20 is defective, due to a crack or an irregular adhesion, air will pass through the defective portion, into or out of the internal space S, indicating an imperfect connection between the stepped portion 19 and the transparent window member 20. The degree of pressure change indicates the degree of the water tightness.

Since the dummy casing 22, according to the present invention, has a dummy lens portion 23 located within the internal space S of the front cover 12, the volume of the internal space S is identical to that of the internal space S in which the lens portion 17 of a camera body would be actually housed. Consequently, the examination of water tightness of the front cover 12 can be effected under the same conditions as the assembled product. Note, however, that the dummy casing 22, without the dummy lens portion 23, can also be used to test the water tightness of the front cover 12.

Although, in the illustrated embodiment, water tightness is determined by establishing a pressure difference between the inside and the outside of the internal space S, and subsequently measuring the change in air pressure per unit time via air passage 26, it is possible to carry out the test without the air passage 26. For example, water tightness can be examined by submerging the assembly of dummy casing 22 and front cover 12 into a liquid, so that a buoyancy force exerted by the water on the assembly would generate a bubble if a defect existed.

Furthermore, it is possible to find a small defect by enclosing the assembly of the dummy casing 22 and the front cover 12 within a sealed container, increasing the air pressure within the sealed container, for a period of time sufficient for the pressure within the container and the pressure within the assembly to equalize, removing the assembly, and then immediately submerging the assembly in water. If the front cover 12 is defective, air introduced into the internal space S will be forced out through the defected area.

Although the dummy casing 22 is made of silicone rubber in the illustrated embodiment, it can be made of, for example, synthetic resin or another suitable material.

As can be seen from the above discussion, according to the present invention, since the water tightness of the divided casing elements can be effected by using the dummy casing, even before the divided casing elements are assembled, the testing operation becomes less difficult and the operational efficiency of the process can be increased. Furthermore, since the dummy casing 22 is molded by a liquid rubber material, even if the object to be tested (casing member) has a complex or curved connecting surface, the dummy casing 22 to be connected thereto can be easily produced.

We claim:

1. A method for testing the waterproofness of a camera body having divided casing elements which are connected to each other at opposite end surfaces thereof, comprising:
    forming a dummy casing by inserting a connecting end surface of one of the divided casing elements of a camera body into a liquid rubber material and curing the same to form a recessed groove corresponding to the connecting end surface of said one of the divided casing elements;
    whereby other divided elements, having similar connecting end surfaces to said one of the divided elements, are tested by a connecting end surface of a divided casing element to be tested into the recessed groove of the dummy casing;
    forcing said divided casing element to be tested against the dummy casing to form a sealed assembly; and,
    testing waterproofness of said sealed assembly to determine waterproofness of the casing element to be tested for use in a camera body.

2. A testing method according to claim 1, wherein said dummy casing has an air passage which connects inside to outside of the sealed assembly, said air passage being used to establish an air pressure difference between the inside and outside thereof, and wherein change in pressure on the inside of the assembly per unit time is determined after a predetermined air pressure difference is established.

3. A testing method according to claim 1, wherein said dummy casing is provided with a projection such that a shape of the dummy casing together with the projection is substantially identical to a shape of a portion of the camera body to be enclosed by the divided casing element to be tested.

4. A testing method according to claim 1, wherein said dummy casing is made of silicone rubber.

5. A testing method according to claim 1, wherein connecting end surfaces of the divided casing elements are provided with male and female connectors.

6. A testing method according to claim 2, wherein the pressure difference is established by withdrawing air from the inside of the sealed assembly, via the air passage.

7. A testing method according to claim 2, wherein the pressure difference is established by forcing air into the sealed assembly, via the air passage.

8. A testing method according to claim 6, further comprising;
connecting an air passage connecting member to the dummy casing to connect the air passage to an external air decompression device.

9. A testing method according to claim 7, further comprising;
connecting an air passage connecting member to the dummy casing to connect the air passage to an external air compression device.

10. A testing method according to claim 1, wherein waterproofness of said assembly is examined by submersing the sealed assembly in a liquid so that a defect can be determined to exist if air escapes from the inside of the assembly.

11. A testing method according to claim 1, further comprising;
enclosing the sealed assembly in a high pressure container for a period of time sufficient for a pressure of the container and an internal pressure of the assembly to equalize through a small defect in the assembly;
removing the assembly and immediately submerging the same in a liquid so that a small defect can be determined to exist if air escapes from within the assembly.

12. An apparatus for testing the waterproofness of a camera body having divided casing elements which are connected to each other with a water tight seal at opposite end surfaces thereof, comprising;
a dummy casing made from liquid rubber material which has been cured after a connecting end surface of one of the divided casing elements has been inserted therein, to form a recessed groove corresponding to the connecting end surface whereby to provide a connecting portion to which other divided casing elements to be tested having similar connecting end surfaces as to said one of the divided casing elements can be connected in a water tight seal to form a waterproof assembly; and
an open ended passage extending through said dummy casing, and means for varying pressure in the sealed assembly to test the waterproofness of the assembly.

13. A testing apparatus according to claim 12, wherein said dummy casing is provided with a projection such that a shape of the dummy casing together with the projection is substantially identical to a shape of a portion of the camera body to be enclosed by the divided casing element.

14. A testing apparatus according to claim 12, wherein said dummy casing is made of silicone rubber.

15. A testing apparatus according to claim 12, wherein said divided casing elements are provided with male and female connectors on the respective connecting end surfaces.

16. A testing apparatus according to claim 12, wherein said divided casing elements are provided with male and female connectors on the respective connecting end surfaces.

17. A testing apparatus according to claim 16, further comprising;
a connecting member which the air passage to the pressure varying means.

18. A testing apparatus according to claim 17, wherein the pressure varying means is an external air compression device.

19. A testing apparatus according to claim 17, wherein the pressure varying means is an external air decompression device.

* * * * *